United States Patent
Beneteau

[11] Patent Number: 4,561,143
[45] Date of Patent: Dec. 31, 1985

[54] WIPER BLADE WITH AIR DEFLECTING DEVICE

[75] Inventor: Christian Beneteau, Gorcy, France

[73] Assignee: Champion Spark Plug Europe S.A., Virton, Belgium

[21] Appl. No.: 632,489

[22] Filed: Jul. 19, 1984

[30] Foreign Application Priority Data

Aug. 18, 1983 [FR] France ................................ 83 13443

[51] Int. Cl.[4] ............................ B60S 1/04; B60S 1/38
[52] U.S. Cl. ............................................... 15/250.42
[58] Field of Search ........................ 15/250.35–250.42

[56] References Cited

FOREIGN PATENT DOCUMENTS

| 282679 | 9/1964 | Australia ............................ 15/250.42 |
| 2346100 | 4/1975 | Fed. Rep. of Germany . |
| 2513952 | 4/1983 | France . |
| 2513953 | 4/1983 | France . |

*Primary Examiner*—Peter Feldman

*Attorney, Agent, or Firm*—Wood, Dalton, Phillips, Mason & Rowe

[57] ABSTRACT

A wiper blade having a superstructure (1,2) linked to wiping element (8) which is reinforced by a longitudinal pressure distributing profile (7,20) provided with a first air deflecting device (9) consisting of a deflector (10) located at a certain distance (d1) from the wiping element (8) and that one or more longitudinal openings (11) are provided between the longitudinal pressure distributing profile (7,20) and the deflector (10). The lower edge of the deflector (10) is located at a certain distance (d2) from the surface to be wiped (18) such that the ratio between (a) the distance (d1) between the deflector (10) and the wiping element (8) and (b) the distance (d2) between the lower edge of the deflector (10) and the surface to be wiped (18) is substantially equal to ten. Optionally, a second air deflecting device (21) is attached to the longitudinal pressure distributing profile (20) of the wiping element (8) on the side opposed to the first air deflecting device (9).

20 Claims, 15 Drawing Figures

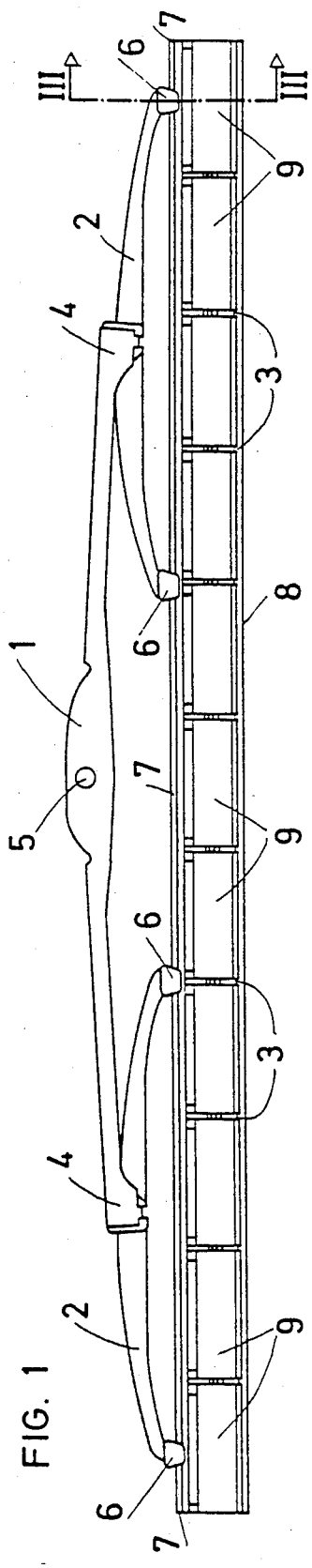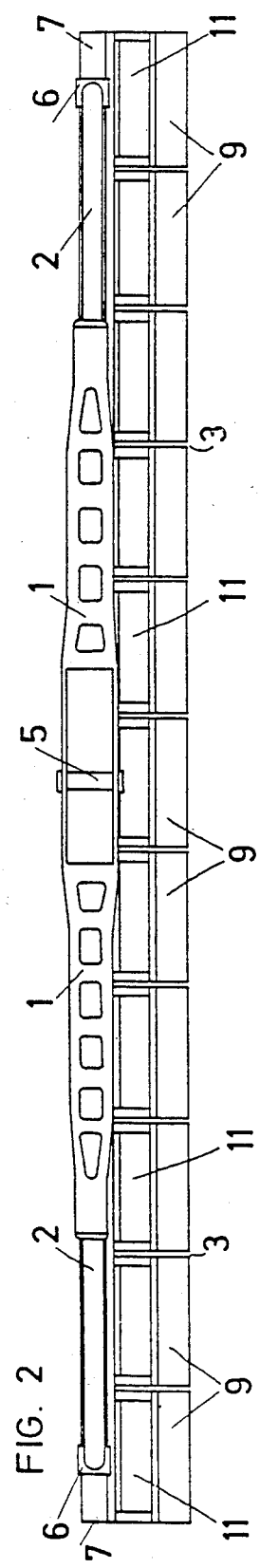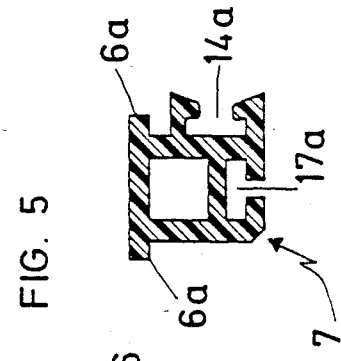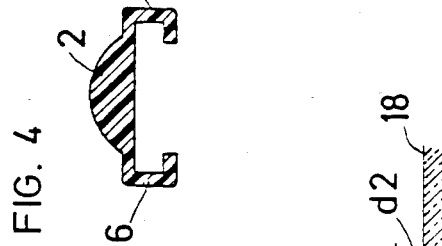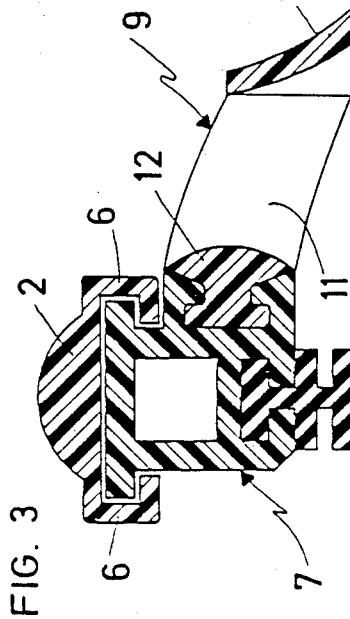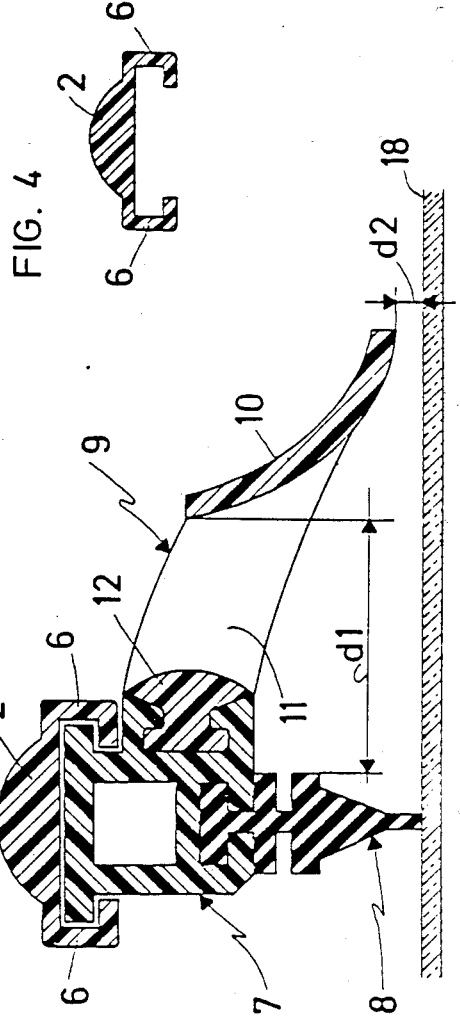

WIPER BLADE WITH AIR DEFLECTING DEVICE

BACKGROUND OF THE INVENTION

1. Field of the Invention

The present invention relates to a wiper blade, in particular for motor vehicles, having a superstructure linked to a wiping element which is reinforced by a longitudinal pressure distributing profile provided with an air deflecting device.

2. Background of the Prior Art

Air deflecting devices which are attached to one of the elements of the superstructure of a wiper blade are well known in the prior art. By way of example, the French Patent Publication No. 2,513,953, wherein the air deflecting device is attached to the main bridge of the superstructure of the wiper blade, and the German (DE) Patent Publication No. 23 46 100, wherein the air deflecting device is attached to the secondary bridges or yokes of the superstructure of the wiper blade, may be mentioned.

Indeed the air deflecting device according to the present invention is not attached to one of the elements of the superstructure of the wiper blade, but is attached to the flexor or longitudinal pressure distributing profile with which the wiping element of any wiper blade is provided.

An air deflecting device attached to (or being an integral part of) the flexor or longitudinal pressure distributing profile of the wiper blade is known through the French Patent Publication No. 2,513,952. However, the different forms of an air deflecting device disclosed in this French patent publication solve the air deflecting problem only very imperfectly, just as, by the way, the solutions proposed in the French Patent Publication No. 2,513,953 and in the German (DE) Patent Publication No. 23 46 100.

The problem to be solved is: when the wiper blades of a motor vehicle are working and when said vehicle moves at a relatively high speed, the wiper blades have a tendency to lift, i.e. to move away from the windshield under the action of the air which flows along the windshield, thus rendering the visibility worse and worse as the speed of the vehicle increases.

As a matter of fact, depending on the speed of the vehicle, three stages may be distinguished in the thus defined phenomenon. During the first stage slight wiping defects slowly appear on the windshield. These defects, in spite of the fact that they are not negligible, still permit driving of the vehicle without taking too important of a risk. During the second stage these wiping defects become more and more important and it becomes dangerous to drive the vehicle. The third stage corresponds to the moment where the wiping element lifts or moves away from the windshield. At this moment there is no longer any visibility and the driver is forced to slow down the speed of the vehicle.

Tests performed on vehicles placed in a wind-tunnel have shown that the starting point of each of the three above-mentioned stages can be displaced towards higher vehicle speeds, for example in using air deflecting devices attached to one or the other element of the wiper blade.

These tests have also shown that the studied phenomenon depends on certain parameters which are not directly linked to the type of wiper blade or to the type of air deflecting device used. One can mention the influence of the form and of the inclination of the windshield of the vehicle.

In taking into consideration only the air deflecting devices attached to the flexor or longitudinal pressure distributing profile, tests in the wind-tunnel have shown that, for guaranteeing a maximum efficiency, an air deflecting device of this type must comply with the following conditions:

1. The properly so called deflector (as opposed to the attachment means) must be located at a non-negligible distance from the wiping element of the wiper blade.

2. It must be possible for the air to circulate between the properly so called deflector on the one side and the assembly wiping element/longitudinal pressure distributing profile on the other side, or in other words, there must be a longitudinal opening between the properly so called deflector and the longitudinal pressure distributing profile of the wiping element.

3. The ratio between (a) the distance between the properly so called deflector and the wiping element and (b) the distance between the lower edge of the properly so called deflector and the surface to be wiped is substantially equal to ten.

In none of the embodiments disclosed in the three above mentioned patent publications were these three conditions complied with and the tests have shown that in such a case the positive effect obtained is relatively small. Furthermore, if the mentioned conditions are not complied with and if other parameters have a negative effect, the total effect may be negative.

SUMMARY OF THE INVENTION

The wiper blade according to the invention is substantially characterized by the fact that the air deflecting device consists of a properly so called deflector located at a certain distance from the wiping element and that one or more longitudinal openings are provided between the longitudinal pressure distributing profile and the properly so called deflector.

Another characteristic of the wiper blade according to the invention is the fact that the ratio between (a) the distance between the properly so called deflector and the wiping element and (b) the distance between the lower edge of the properly so called deflector and the surface to be wiped is substantially equal to ten.

An object of the invention is thus to provide a wiper blade having an air deflecting device with an efficiency, as to the visibility at high speed, which is very superior to the efficiency of similar known systems.

The invention will be better understood when reading the following description of one embodiment of the invention in conjunction with the appended drawings.

DESCRIPTION OF THE DRAWINGS

FIG. 1 is an elevational view of the wiper blade according to the invention, with a first air deflecting device;

FIG. 2 is a top view of the wiper blade of FIG. 1;

FIG. 3 is a section, at a larger scale, along line III—III of FIG. 1;

FIGS. 4, 5 and 6 show, separately and at a somewhat reduced scale, three elements of FIG. 3;

BEST MODE FOR CARRYING OUT THE INVENTION

Figure 7:
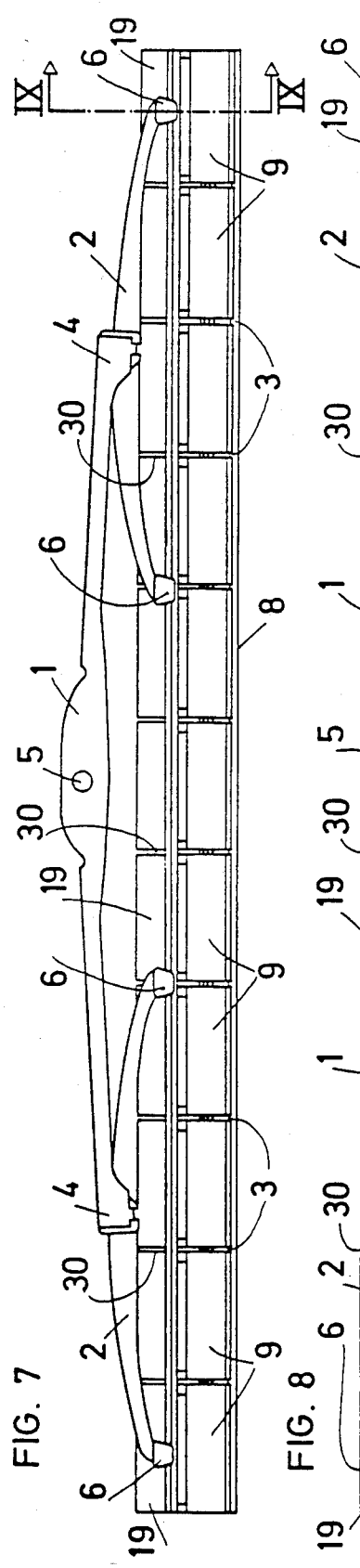
FIG. 7 is an elevational view of the wiper blade according to the invention, with two air deflecting devices.
Figure 8:
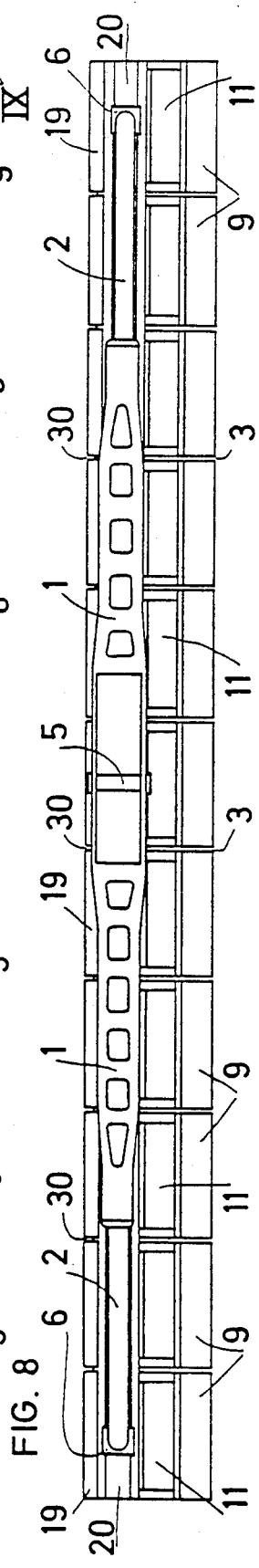
FIG. 8 is a top view of the wiper blade of FIG. 7.
Figure 12:
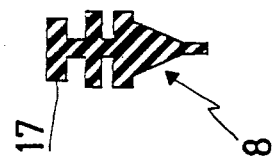
FIGS. 10, 11 and 12 show, separately and at a somewhat reduced scale, three elements of FIG. 9.

FIGS. 1 through 6 and FIG. 14 thus relate to a wiper blade provided with one (first) air deflecting device 9, the air deflecting device being located on one side of the wiping element 8 while FIGS. 7 through 13 and FIG. 14 relate to a wiper blade provided with two (first and second) air deflecting devices 9,21 located respectively on one and on the other side of the wiping element 8.

In FIGS. 1 through 6, the properly so called wiper blade (i.e. without taking into consideration the first air deflecting device 9) comprises the following elements: a main bridge 1, two secondary bridges or yokes 2 provided with claws 6, an articulation 4 between the main bridge and each of the two secondary yokes 2, a longitudinal pressure distributing profile 7, a wiping element 8 and lastly a rivet 5 upon which the oscillating wiper arm (not shown) will act. Oscillating wiper arms are well known in prior art since they are used on all wiper systems of this type.

The thus described wiper blade is also well known in the prior art and it is not necessary to explain in detail how it works. However, it is to be noted that the present invention is not limited to wiper blades of the above described type. To the contrary, the invention is applicable to all the types of wiper blades which include a pressure distributing profile to which air deflecting devices such as described and claimed hereunder may be attached in one or the other way.

Figure 14:
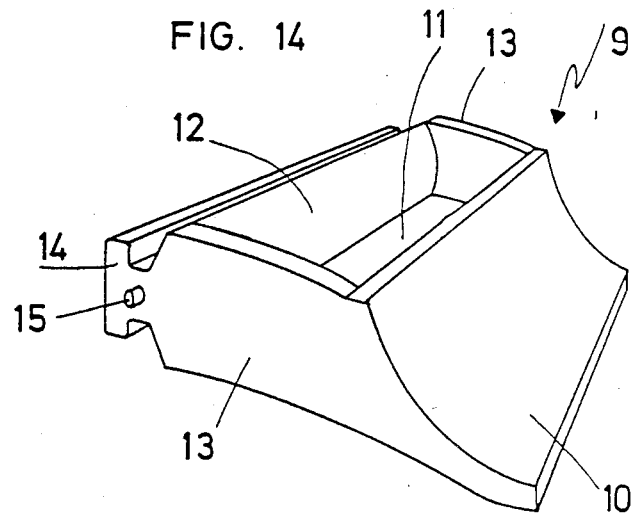
FIG. 14 is a perspective view of one element or module of the first air deflecting device of FIGS. 3 and 9.

The first air deflecting device 9 essentially comprises the following elements: the properly so called deflector 10, the attachment means 12 and the transverse walls 13 (transverse with respect to the pressure distributing profile 7) which secure the properly so called deflector 10 to the attachment means 12. The properly so called deflector 10 is thus separated from the attachment means 12 by a longitudinal opening 11 (FIG. 14).

The attachment means 12 of the air deflecting device 9 comprises the male T-shaped part 14 of a sliding attachment system of which the female part 14a (FIG.5) is disposed on the lateral wall of the pressure distributing profile 7. When mounting the air deflecting device 9, the male part 14 of the attachment means is thus inserted into the female part 14a of the pressure distributing profile 7. The air deflecting device 9 may be blocked on the pressure distributing profile 7 by several known means or devices, for example by a welding point at the two extremities of the pressure distributing profile 7.

In FIGS. 1 and 2, the air deflecting device is shown in the form of a plurality of elements or modules 9a juxtaposed along the pressure distributing profile 7. The advantage of this system is that the assembly pressure distributing profile/air deflecting device adapts its form better to more or less curved windshields. However, it is quite evident that the number of these elements or modules 9a may vary and it is quite conceivable that only one element is used for relatively slightly curved windshields.

If several elements or modules 9a are used they are preferably separated, one from the other, by small spaces 3. In order to guarantee said spaces 3, each element 9a is provided with a small projection 15 (FIG. 14) on one of its transverse walls 13.

As already mentiond above and for obtaining the best efficiency, it is indispensable that the ratio between (a) the distance d1 between the properly so called deflector 10 and the wiping element 8 and (b) the distance d2 between the lower edge of the properly so called deflector 10 and the surface to be wiped 18 is substantially equal to ten (FIG. 3). The configuration of the properly so called deflector 10 itself is of relatively less importance, but said deflector will preferably have a transverse section with a slight curvature which is convex towards the wiping element 8.

It is to be noted that the transverse form of the pressure distributing profile 7 of FIGS. 3 and 5 is only to be considered as an example. Indeed, said profile 7 may have any section inasmuch as means are provided for laterally attaching thereto the air deflecting device according to the invention. Thus, the elements 6a and 17a, respectively relating to the attahment of the claws 6 and of the upper portion 17 of the wiping element 8 (FIGS. 5 and 6), need not necessarily have the configuration shown on the drawings.

Furthermore, the attachment means of the air deflecting device 9 is not necessarily a sliding system. Indeed, another system may easily be designed, such as for example, a snap-on system. The pressure distributing profile and the air deflecting device may also be molded in one piece of an appropriate plastic material.

In FIGS. 7 through 12 the properly so called wiper blade (i.e. without taking into consideration the two air deflecting devices 9,21) comprises the same elements as the wiper blade of FIGS. 1 through 6. All the elements of this wiper blade have also the same form as the corresponding elements of the wiper blade 1 through 6, except for the pressure distributing profile 20 which, in the present case, is provided with a second attachment means for attaching thereto the second air deflecting device 21.

Figure 9:
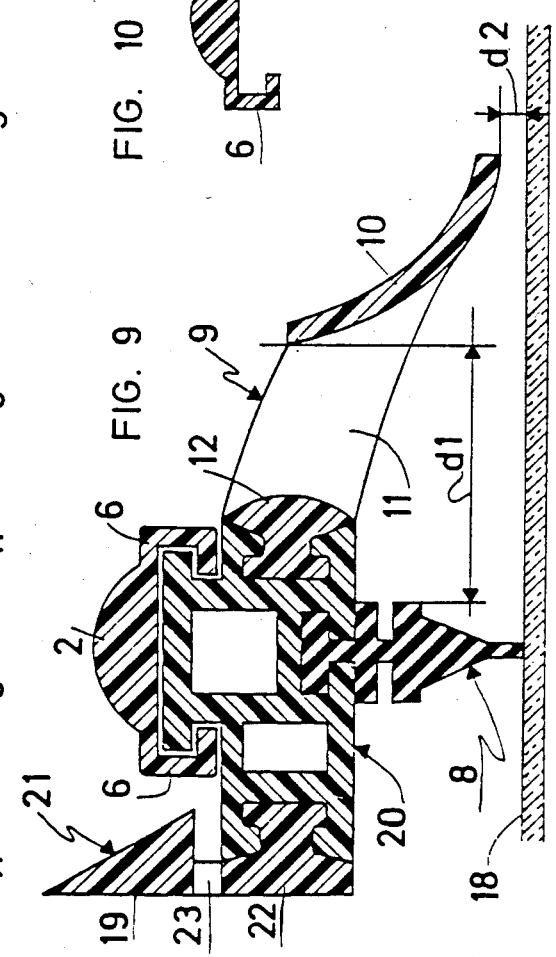
FIG. 9 is a section, at a larger scale, along line IX—IX of FIG. 7.
Figure 13:
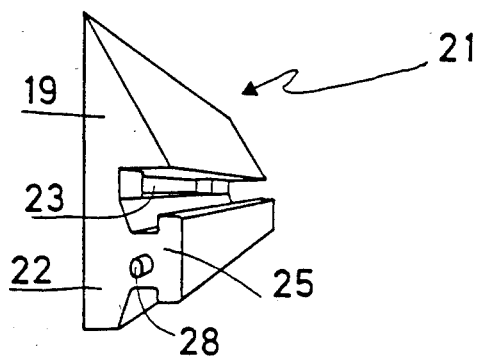
FIG. 13 is a perspective view of one element or module of the second air deflecting device of FIG. 9.

All what has been said above about the first air deflecting device is also valid for the air deflecting device 9 of FIGS. 7 through 12 because it is exactly the same as the one of FIGS. 1 through 6, the attachment means for attaching the air deflecting device 9 to the pressure distributing profile 20 included (FIG. 9).

As can be seen in FIG. 9, the second air deflecting device 21 is attached to the pressure distributing profile 20 of the wiping element 8 on the side opposite to the first air deflecting device 9. It comprises a lower portion 22 provided with a T-shaped projection 25 (FIG. 13) and an upper portion forming the properly so called deflector 19. A longitudinal opening 23 (longitudinal with respect to the pressure distributing profile 20) extends between the lower portion 22 and the upper portion 19 of said second air deflecting device 21.

The lower portion 22 of the second air deflecting device 21 comprises the T-shaped male part 25 of a sliding attachment system of which the female part 25a (FIG. 11) is disposed on the lateral wall of the pressure distributing profile 20, which wall is on the opposite side of the wall of the pressure distributing profile 20, and on the opposite side of the first air deflecting device 9.

Just as in the case of the first air deflecting device 9 of FIGS. 1 through 6, the second air deflecting device 21 may be designed in one single module or in a plurality of modules. In this last case each module is provided on one of its transverse walls with a small projection 28 (FIG. 13) which guarantees that between two modules there is a small space 30 which makes the assembly air deflecting device/pressure distributing profile more flexible.

Figure 11:
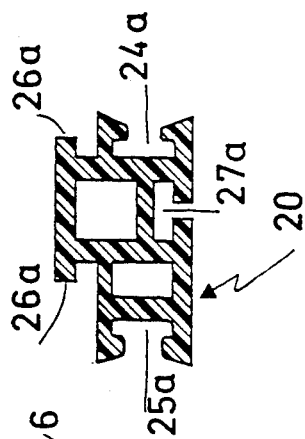
Figure 10:

The transverse section of the pressure distributing profile 20 of FIGS. 9 and 11 is also only an example and the elements 26a and 27a, respectively relating to the attachment of the claws 6 and of the upper portion 17 of the wiping element 8 (FIGS. 11 and 12), need not necessarily have the form indicated in the drawings. Also, one may either design another attachment system for the second air deflecting device or realize the assembly first air deflecting device/pressure distributing profile/second air deflecting device in one single plastic piece.

The second air deflecting device 21 should be considered as being an optional complement to the first air deflecting device 9. Indeed, the second air deflecting device 21 somewhat increases the efficiency of a wiper blade already provided with the first air deflecting device 9, but it is essentially said first air deflecting device 9 which determines the efficiency of the wiper blade as to the visibility at high speed. For this reason the influence of the second air deflecting device 21 has been neglected in the comparative diagram of FIG. 15.

Figure 15:
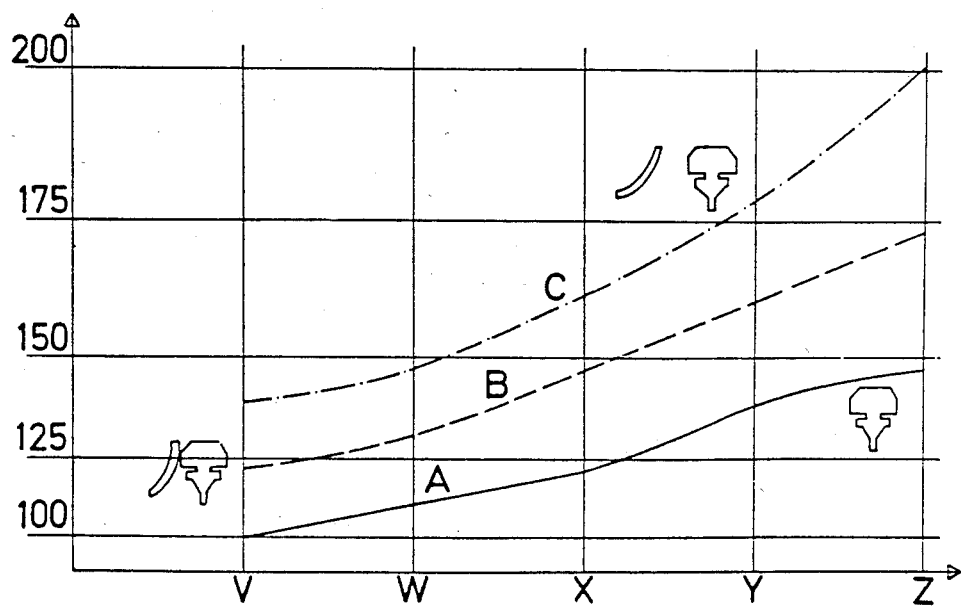
FIG. 15 is a comparative diagram showing the efficiency, as to the visibility at high speed, of a wiper blade not provided with an air deflecting device, of a wiper blade provided with an air deflecting device adjacent to the wiping element and of a wiper blade according to the invention, i.e. of a wiper blade provided with a deflector located at a non-negligible distance from the wiping element.

The diagram of FIG. 15 shows on the ordinate the speed of the vehicle in km/h and on the abscissa the points V, W, X, Y and Z, which each represents a certain "image of the wiping defects". The wiping defects increase towards the right side of the diagram and roughly it can be said:

1. The points V and W represent the first stage mentioned above, i.e. the stage during which the vehicle can still be driven without taking too important risks.
2. The points X and Y represent the second stage, i.e. the stage during which it becomes dangerous to drive the vehicle.
3. The point Z represents approximately the beginning of the third stage, i.e. the point where the wiping element moves away from the windshield and where the driver is forced to slow down the speed of the vehicle.

The line A of the diagram shows the efficiency of a wiper blade which is not provided with an air deflecting device. Line B shows the efficiency of the same wiper blade provided with a known air deflecting device, i.e. an air deflecting device which is adjacent to the wiping element. The line C shows the efficiency of the same wiper blade provided with an air deflecting device according to the present invention.

The diagram of FIG. 15 clearly shows that with a wiper blade provided with an air deflecting device according to the invention (line C), the wiping defects at all stages (V+W; X+Y,Z) appear substantially later (i.e. at higher speeds) not only than with a wiper blade, which is not provided with an air deflecting device (line A), but also than with a wiper blade provided with a known air deflecting device (line B).

In somewhat summarizing and simplifying the diagram of FIG. 15 it can be said that the increase of the wiping efficiency between the line C (deflector according to the invention) and the line B (known deflector) is more or less equal to the increase of the wiping efficiency between the line B (known deflector) and the line A (no deflector).

In expressing the lines of the diagram in numbers, it can be seen that the increase of the wiping efficiency between the line C (deflector according to the invention) and the line B (known deflector) is more or less equal to the increase of the wiping efficiency between the line B (known deflector) and the line A (no deflector).

In expressing the lines of the diagram in numbers, it can be seen that the increase of the wiping efficiency between the line C (deflector according to the invention) and the line B (known deflector) is approximately as follows:

(a) +20 km/h at the point V, i.e. ±140 km/h instead of ±120 km/h.

(b) +15 km/h at the point X, i.e. ±160 km/h instead of ±145 km/h.

(c) +25 km/h at the point X, i.e. ±160 km/h instead of ±175 km/h.

When comparing line C (deflector according to the invention) and line A (no deflector), the increase of the wiping efficiency is approximately as follows:

(a) +40 km/h at the point V, i.e. ±140 km/h instead of ±100 km/h.

(b) +40 km/h at the point X, i.e. ±160 km/h instead of ±120 km/h.

(c) +50 km/h at the point Z, i.e. ±200 km/h instead of ±150 km/h.

The diagram of FIG. 15 is based on the data obtained in a wind-tunnel with wiper blades working on standard vehicles. The lines A, B and C are therefore reproducible insofar as the test conditions are the same. Indeed, the form of the lines may somewhat vary as a function of the type of the wiper blade and as a function of the type of the vehicle used during the tests.

Embodiments of a new invention has thus been disclosed, but it is quite evident that the invention is not limited to the illustrated embodiments. Indeed, modifications and/or changes may be made without departing from the scope of the invention such as defined in the appended claims.

I claim:

1. A wiper blade for motor vehicles or the like, comprising:
   a superstructure connected to a wiping element which is reinforced by a longitudinal pressure distributing profile; and
   an air deflecting device connected to the pressure distributing profile and including a deflector spaced from the wiping element to define at least one air opening between the deflector and the pressure distributing profile.

2. The wiper blade of claim 1 wherein the deflector includes a lower edge spaced from the surface to be wiped when the wiper blade is in its working position.

3. The wiper blade of claim 2 wherein the ratio between (a) the distance between the deflector and the wiping element and (b) the distance between the lower edge of the deflector and the surface to be wiped is substantially equal to ten.

4. The wiper blade of claim 1, including complementary interengaging means between the pressure distributing device and the air deflecting device for removably attaching the air deflecting device to the pressure distributing device.

5. The wiper blade of claim 4 wherein said complementary interengaging means comprises a sliding connection.

6. The wiper blade of claim 1 wherein the air deflecting device comprises a plurality of elements juxtaposed along the pressure distributing profile.

7. The wiper blade of claim 1, including a second air deflecting device connected to the pressure distributing profile on a side thereof opposite the first air deflecting device.

8. The wiper blade of claim 7 wherein the second air deflecting device includes an upper portion defining a deflector and a lower portion connected to the pressure distributing profile.

9. The wiper blade of claim 8 wherein at least one air opening is provided between said upper and lower portions.

10. The wiper blade of claim 9 wherein the air deflecting device comprises a plurality of elements juxtaposed along the pressure distributing profile.

11. The wiper blade of claim 7 wherein the pressure distributing profile and the first and second air deflecting devices are fabricated of plastic material.

12. A wiper blade for motor vehicles or the like, comprising:
  a superstructure connected to a wiping element which is reinforced by a longitudinal pressure distributing profile;
  an air deflecting device connected to the pressure distributing profile, the air deflecting device including
  (a) complementary interengaging means between the pressure distributing device and the air deflecting device for removably attaching the air deflecting device to the pressure distributing device,
  (b) a deflector spaced from the wiping element and defining at least one air opening between the deflector and said complementary interengaging means, and
  (c) a lower edge of the deflector spaced from the surface to be wiped when the wiper blade is in its working position.

13. The wiper blade of claim 12 wherein the ratio between (a) the distance between the deflector and the wiping element and (b) the distance between the lower edge of the deflector and the surface to be wiped is substantially equal to ten.

14. The wiper blade of claim 12 wherein said complementary engaging means comprises a sliding connection.

15. The wiper blade of claim 12 wherein the air deflecting device comprises a plurality of elements juxtaposed along the pressure distributing profile.

16. The wiper blade of claim 12, including a second air deflecting device connected to the pressure distributing profile on a side thereof opposite the first air deflecting device.

17. The wiper blade of claim 16 wherein the second air deflecting device includes an upper portion defining a deflector and a lower portion connected to the pressure distributing profile.

18. The wiper blade of claim 17 wherein at least one air opening is provided between said upper and lower portions.

19. The wiper blade of claim 18 wherein the air deflecting device comprises a plurality of elements juxtaposed along the pressure distributing profile.

20. The wiper blade of claim 16 wherein the pressure distributing profile and the first and second air deflecting devices are fabricated of plastic material.

* * * * *